H. P. HAAS.
ELASTIC TIRE FOR VEHICLE WHEELS.
APPLICATION FILED NOV. 1, 1911.

1,071,229.

Patented Aug. 26, 1913.

Witnesses.

Inventor,
Herman Philippe Haas,

UNITED STATES PATENT OFFICE.

HERMAN PHILIPPE HAAS, OF BRUSSELS, BELGIUM.

ELASTIC TIRE FOR VEHICLE-WHEELS.

1,071,229.  Specification of Letters Patent.  Patented Aug. 26, 1913.

Application filed November 1, 1911. Serial No. 657,906.

*To all whom it may concern:*

Be it known that I, HERMAN PHILIPPE HAAS, a subject of the Queen of the Netherlands, residing at Brussels, Belgium, have invented new and useful Improvements in Elastic Tires for Vehicle-Wheels; and I do hereby declare the following to be a full, clear, and exact description of the same.

This invention relates to elastic vehicle tires and particularly to tires of this class in which the elasticity is afforded by a series of separate elastic devices suitably secured in the peripheral portion of the wheel, and it consists in certain improvements in such tires designed to facilitate the assembling and disassembling thereof, increase their resilience, make them more durable and more perfectly insure the retention of the elastic devices in the holding means therefor.

The accompanying drawing shows by way of example a construction according to this invention.

Figure 2:
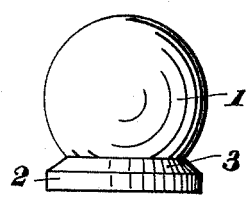
Figure 1:
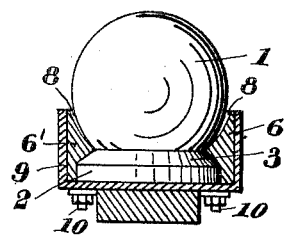
Figure 3:
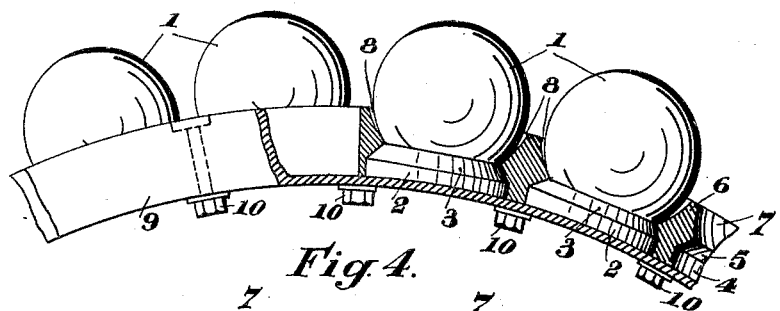
Figure 4:
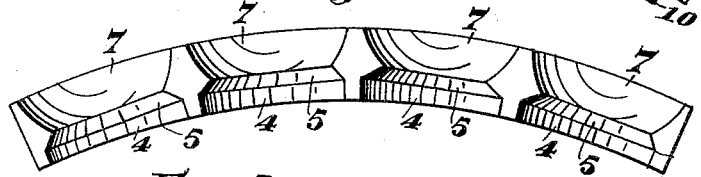
Figure 5:
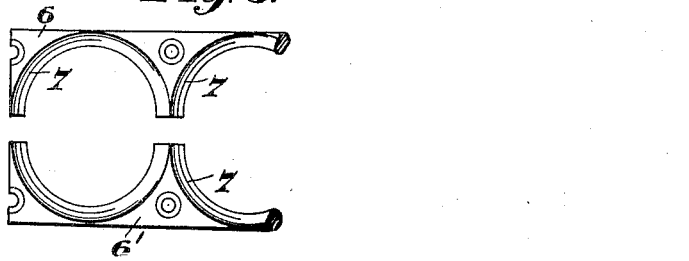

Figure 1 is an elevation of an elastic body in the form of a spherical ball, Fig. 2 a view of the same elastic body on a wheel rim shown in cross-section, Fig. 3 a side elevation and longitudinal section of a portion of a rim provided with elastic balls, Fig. 4 a view of one half of the box for securing the balls, and Fig. 5 a plan of a portion of the said securing box.

The elastic bodies according to this invention have the peculiar form shown in the drawing, the body part 1 thereof being spherical and having a base whose lower portion 2 is substantially cylindrical and whose upper portion 3 is outwardly conical, that is, converges from portion 2 toward the body part 1. A box 6 6' is formed to receive each of these devices, thus: It has an inner recess 4, cylindrical and of the same diameter and depth as the portion 2 of the elastic device; a concave outer recess 7 having a greater radius than said portion 2 of the elastic device; and, joining recesses 4 and 7, a conical opening 5 of the same shape and size as portion 3 of the elastic device. When each elastic device is therefore fitted into the box as shown in the drawing the parts 2 and 3 of the same exactly fit and conform to the portions 4 and 5 of the box, the ball 1 of the elastic device being surrounded by a slight space 8 between it and the surface of recess or socket 7. The boxes 6 6' are segmental and have their end surfaces flat, arranged in planes radial of the wheel and abut end-to-end against each other. Each box is snugly fitted into a cross-sectionally U-shaped rim 9 to which it is secured by the bolts or the like 10. The bottom of each box bears squarely against the inner or cylindrical wall of the rim, as does also the base 2 of each elastic device. The several boxes are divided, each into the sections 6 6', in the central plane of the rim, as shown best in Fig. 5, so that the ready assembling and disassembling of the parts of any one of the units may be accomplished.

The peculiar form of each elastic device, taken with the fact that the box receiving the same conforms exactly in shape to and snugly fits its portions 2, 3 give increased strength and durability to each unit, thus: Since the portions 3 and 5 of the elastic device and box, respectively, are outwardly conical and bear face-to-face against each other throughout their whole extent, and since the portions 2 and 4 have the same relation (there thus being a base on the elastic device having appreciable vertical dimension and joined to the ball 1 by a gradually reducing neck 5 and a socket in the box which conforms to and fits the said base) the resistance to the withdrawing of the elastic device out of the box is greatly increased and said device is at the same time formed with a base and neck portion having the maximum strength to resist the tearing away of the ball 1 at said neck. These are important features in a structure of this character, especially in view of lateral stress on the tire when the tire makes a turn or the vehicle for any other reason tends to displace the perimeter of the tire laterally.

It will be understood that the space 8 has for its special purpose to give the ball 1 a certain limited freedom of expansion as in the rotation of the wheel it comes in contact with the ground.

Having fully described the nature of my invention, what I claim and desire to secure by Letters Patent is:—

In combination, the exteriorly and continuously channeled rim, a continuous series of blocks abutting against each other and arranged in and fitting the channel of said rim and each having an outwardly opening socket, said socket including a concave outer portion forming a seat, a restricted outwardly conical portion below the seat, and a cylindrical portion below said restricted portion, a series of elastic bodies each arranged in a socket and each having a spherical body part occupying and of less radius than said seat of the socket, a restricted conical portion occupying and conforming in size and shape to said restricted conical portion of the socket, and a cylindrical portion occupying and conforming in size and shape to the cylindrical portion of the socket and forming a base for said elastic body, and means for securing said blocks to the rim, each block being divided longitudinally of the circumference of the rim, substantially centrally of its socket, substantially as described.

In testimony whereof, I have signed my name to this specification in the presence of two subscribing witnesses:

HERMAN PHILIPPE HAAS.

Witnesses:
CHARLES HOUSER,
CHAS. ROY NASMITH.

Copies of this patent may be obtained for five cents each, by addressing the "Commissioner of Patents, Washington, D. C."